United States Patent [19]

Chireau

[11] 4,034,144
[45] July 5, 1977

[54] SEPARATOR FOR SECONDARY ALKALINE BATTERIES

[75] Inventor: Roland F. Chireau, Quaker Hill, Conn.

[73] Assignee: Yardney Electric Corporation, Pawcatuck, Conn.

[22] Filed: July 27, 1976

[21] Appl. No.: 709,136

[52] U.S. Cl. .............................. 429/144; 429/247; 429/251; 429/252; 106/73.3
[51] Int. Cl.² ........................................ H01M 2/16
[58] Field of Search .......... 429/247, 251, 252, 144; 106/73.3, 299

[56] References Cited

UNITED STATES PATENTS

| | | | |
|---|---|---|---|
| 3,364,077 | 1/1968 | Arrance et al. | 429/251 |
| 3,539,396 | 11/1970 | Wagner | 429/247 |
| 3,625,771 | 12/1971 | Arrance et al. | 429/251 |
| 3,711,336 | 1/1973 | Smatko | 429/247 |
| 3,861,963 | 1/1975 | Arrance et al. | 429/251 |

*Primary Examiner*—Donald L. Walton
*Attorney, Agent, or Firm*—Donald E. Nist

[57] ABSTRACT

A negative interseparator for use as a component in a separator system for alkaline rechargeable batteries comprises about 50% to 95% by weight of a titanate material such as potassium titanate, a matrix-forming fibrous material, and a thickening agent for use in forming the interseparator. The negative interseparator is interposed between the negative electrode and "main separator" in the aforementioned batteries.

17 Claims, No Drawings

SEPARATOR FOR SECONDARY ALKALINE BATTERIES

BACKGROUND OF THE INVENTION

This invention relates to secondary alkaline batteries and, more particularly, it relates to separator systems for use in such batteries.

As described, for example, in Falk and Salkind, *Alkaline Storage Batteries*, pp. 168-170 (1969), it is well known that it is advantageous to interpose a separator system between the electrodes of opposite polarity in rechargeable alkaline batteries, such as silver/zinc and nickel/zinc batteries. In general, such separator systems include materials which are permeable to the electrolyte, but which reduce the migration of ionic or molecular species from one electrode to the other and retard, it not inhibit, dendritic growth from one electrode toward another.

The separator system may include a single separator made up of one or more layers of a semi-permeable membrane made from, for example, cellophane, polyethylene or polypropylene. More commonly, a separator system will comprise (a) a main separator which is a semi-permeable membrane as described, together with (b) a spacer or "positive interseparator" forming a macro-porous barrier between the oxidizing (+) electrode and the main separator and (c) a spacer or "negative interseparator" positioned between the reducing (−) electrode and the main separator. The material forming the positive interseparator is usually an inert base polymer such as nylon, polypropylene, or a vinyl chloride/acrylonitrile copolymer (Dynel), whereas the negative interseparator may be formed from a cellulosic material, nylon or polypropylene felts or nonwoven fabrics.

The negative interseparator serves, or at least is intended to serve, several functions in a cell. It imparts mechanical strength to an electrode, particularly when that electrode is composed largely of a powder, such as zinc oxide. Additionally, it maintains non-adherent insoluble oxides (which may be formed at the negative electrode during charge/discharge cycling) in direct contact with the negative electrode during the charging process so that the required electron transfer can occur. Another function of the negative interseparator is to maintain electrolytic contact across the face of the electrode, which it can do by acting as a wick. The negative interseparator should also inhibit dendritic growth from the negative electrode.

In batteries containing, for example, silver/zinc or nickel/zinc cells together with the described separator systems and materials, it has been found that dendrites of metallic zinc grow from the zinc electrode into, and eventually across, the separator material after numerous charge/discharge cycles. This dendritic growth causes the cells to short circuit. Additionally, it has been found that after cycling, the negative interseparator becomes plated with zinc metal and penetrated by zinc particles. In that condition, it is not capable of performing its intended function.

Although presently-available negative interseparators provide an advantage in alkaline rechargeable cells over their non-use, ion migration, dendritic growth, and current density non-formity still remain significant problems.

SUMMARY OF THE INVENTION

The herein-described invention is embodied in a negative interseparator for use in separator systems in rechargeable alkaline batteries. The negative interseparator comprises about 50% to about 95% by weight of an inorganic titanate compound such as potassium titanate together with an inorganic fibrous material (other than the titanate) and, preferably, a thickening agent to aid in producing the interseparators.

In those electrochemical alkaline cells in which migration of ions produced from the active negative electrode material and/or in which dendritic growth from the negative electrode toward the positive electrode is a problem, the herein-described negative interseparator effectively reduces such ion migration and dendritic growth as compared with negative interseparators utilized heretofore. Additionally, this negative interseparator can be used to advantage with all rechargeable alkaline cells because it absorbs and tenaciously retains electrolyte so that it effectively reduces electrolyte transport thereby minimizing exchange current density, while wetting the entire electrode surface exposed to electrolyte to ensure substantially uniform current density distribution over the wetted area and thereby minimizing electrode shape change. The herein-described negative interseparator is also stable to the alkaline electrolyte and serves to mechanically strengthen the negative electrode.

DESCRIPTION OF THE PREFERRED EMBODIMENT

The herein-described negative interseparator is an essentially inorganic, fibrous composite or admixture which comprises: (a) an inorganic titanate, (b) an inorganic, fibrous material (other than the titanate) and, preferably, (c) a thickening agent. The interseparator is made from an admixture of the aforementioned components dispersed in a fluid medium.

Component (a), i.e., the titanate, is the principal or "active" material in the interseparator in that it is primarily responsible for the improvements produced by the herein-described interseparator. The titanate may be, for example, potassium titanate, sodium titanate, magnesium titanate, calcium titanate, cerium titanate, barium titanate, complex titanates such as magnesium-calcium titanate, and mixtures of the foregoing titanates. These titanates are usually fibrous themselves. A typical size of presently-available potassium titanate is 0.2 microns in diameter × 10 microns in length.

Although the titanates are themselves fibrous, they are either too short and/or too brittle to be formed into a wovenlike structure. Therefore, it is necessary that a fibrous material of substantially greater length and flexibility than the presently-available titanate materials be incorporated in the interseparator in order to provide a matrix to mechanically bind together the titanate material. Any such fibrous material should, of course, be as inert to the alkaline media utilized in rechargeable alkaline batteries as possible so that the useful life of any such batteries is not materially reduced. Useful examples of such fibrous materials include chrysotile asbestos, zirconia fibers, alumino-silicate fibers and alumina fibers. Such fibers typically have lengths of 200-500 microns.

The fluid medium may be any liquid in which the other components can be effectivly dispersed and which does not adversely affect the electrochemical characteristics of the interseparator. Useful liquids include water and organic fluids such as lower molecular weight alcohols, e.g., isopropyl alcohol, butyl alcohol, and denatured ethyl alcohol.

Because the viscosity of the fluid media in which components (a) and (b) are dispersed may be too low to prevent those components from separating from each other and/or agglomerating in portions of the liquid media, it is necessary in such cases to increase the viscosity of the fluid media to avoid the aforementioned separation problems to thereby maintain the components in substantially uniform dispersion in the fluid media. This can be accomplished in either of two ways.

First, a thickening agent, per se, can be added to the fluid media to increase the viscosity of the latter. The thickening agent may be a material which is soluble in the fluid media, but solubility is not required. In fact, it has been found that thickening agents which are swellable by a fluid medium to form colloidal gels may be utilized. The thickening agent may function as a chemical binding agent; however, this function is ancillary to its primary function of increasing the fluid media viscosity. The thickening agent utilized herein should not function as a film former since the resulting interseparator will then not exhibit the required microporous characteristics. Accordingly, the term "thickening agent", as used herein, specifically excludes film-forming compounds.

Useful thickening agents are well known and include organic compounds, e.g., hydroxyethyl cellulose, ethyl cellulose, methyl cellulose, and sodium carboxymethyl cellulose, as well as inorganic compounds, e.g., sodium silicate. A useful organic thickening agent/organic liquid medium combination is a 2% (by wt.) solution of hydroxyethyl cellulose powder in 95% (by vol.) denatured ethyl alcohol. An inorganic thickening agent such as sodium silicate may be dissolved in water. Regardless of the thickening agent utilized, it should be one which is relatively inert to the alkaline electrolytes encountered in alkaline rechargeable batteries so that the performance of such batteries is not materially decreased.

A second technique for increasing the viscosity of the liquid media involves use of part of the fibrous matrix material (or similar material) in comminuted form so that gels are formed with the liquid media. When using a matrix material such as the aforementioned asbestos, some of the latter may be reduced in size by mechanical means, e.g., a Waring blender, to produce submicron particles exhibiting colloidal properties. The comminution of the matrix-forming material may take place during the dispersion of the latter in the fluid medium. Sufficient matrix-forming material is comminuted to produce the required increase in the viscosity of the fluid medium, but sufficient matrix-forming material is left in its initial form to provide the matrix-forming function.

The amount of titanate may vary between about 50% and about 95% by weight of the weight of the herein-described components of the interseparator laminate (hereinafter abbreviated to "% by weight"). Below about 50% by weight of the titanate material, the electrochemical properties of the interseparator are adversely affected for the reason that the latter begin to lose the characteristics imparted to them by the titanate and begin to acquire those characteristics (and limitations) imparted to them by the fibrous matrix material. For example, when utilizing a fibrous matrix material such as asbestos, the latter is subject to attack by the alkaline media with resultant breakdown of the composite structure. On the other hand, fibrous materials which are not readily attacked by the alkaline media are generally hydrophobic and, therefore, do not provide sufficient absorption of electrolyte. Above about 95% by weight of titanate material, the latter is insufficiently bound together. Preferably, the titanate is used in a weight range between about 75% and about 92%. Within such range a good balance is provided between having sufficient titanate present to inhibit dendritic growth and negative electrode ion migration, etc., on the one hand, and having sufficient matrix material to provide a mechanically strong interseparator, on the other hand.

The matrix material and thickening agent (if separate from the matrix material) are present in an amount sufficient to make up 100% by weight. Generally, the thickening agent is utilized in amounts between about 0.5% and about 5% by weight, although about 0.5% to about 2.5% by weight is preferred. The preferred range for the matrix-forming material is about 8% to 25% by weight, although it may be used in amounts between about 5% and about 50% by weight if no separate thickening agent is present and about 4.5% to 45% by weight if a separate thickening agent is present.

The negative interseparator may be made as follows using water as the fluid medium. An aqueous slurry is made up of components (a), (b) and (c) in the desired proportions within the concentration ranges previously described. Typically, the weight ratio of components (a), (b) and (c) to the water in the slurry is between about 0.02:1 and about 0.2:1 although ratios outside this range can be used depending upon the particular materials and amounts of components (a), (b) and (c) used in a particular application. This aqueous slurry is placed on a moving belt and is moved past a doctor blade where the particulate materials are spread out to make a relatively uniformly thick slurry. Because of the presence of the thickening agent which functions to provide body to the slurry, the slurry constituents are maintained relatively uniformly distributed throughout the slurry and the latter is capable of holding a given thickness. The slurry is next passed through a heating zone where it is preferably heated at a temperature of about 90° C. to 100° C. until it is dried. The resulting mat is calendered to a final desired sheet thickness, for example, 5–6 mils.

Formation of a negative interseparator utilizing an organic solvent rather than water is substantially the same as described when using a water-based slurry except that somewhat different temperatures may be employed in the drying operation.

The negative interseparator is a microporous structure exhibiting minimum resistance to the flow of electrolyte. Such interseparators, when made from potassium titanate, asbestos and 2% thickening agent, typically have an average pore diameter on the order of 800 to 1200 microns and typically have a volume porosity on the order of 60 percent.

The described interseparator may be used together with a main separator or with a main separator and a positive interseparator as is well known. Typically, the negative interseparator is used as a "U"-wrap around the negative electrode. One or more layers of the negative interseparator composite may be used together.

The alkaline cells in which the herein-described separator finds utility include silver/zinc, silver/cadmium, nickel cadmium, nickel/zinc, nickel/iron, mercuric oxide/zinc, and mercuric oxide/cadmium cells. Such cells may contain sodium hydroxide, potassium hydroxide, lithium hydroxide, barium hydroxide, and combinations thereof, as the electrolyte, as is well known.

The invention will be further described by the following Example.

EXAMPLE

Silver zinc cells were constructed with each cell including two silver positive electrodes (measuring 1.62 in. × 1.5 inc. × 0.034 in.) and three zinc negative electrodes (measuring 1.62 in. × 1.5 in. × 0.042 in.) with the zinc electrodes being disposed on each side of the silver electrodes. The negative electrodes consisted of 95% by weight zinc oxide and 5% by weight mercuric oxide.

A separator system was employed in each cell utilizing the "U" wrap technique with each separator system comprising: a positive nylon (Pellon) interseparator; a silverized cellophane main separator; and a negative interseparator comprising 89% by weight potassium titanate; 9% by weight chrysotile asbestos fiber, and 2% by weight carboxymethyl cellulose.

The aforementioned structure was disposed within a plastic casing to which there was added an aqueous potassium hydroxide solution comprising 40% by weight potassium hydroxide.

Each cell had the aforementioned structure and differed only in that different thicknesses of the negative interseparator were utilized as shown in the Table and with the further exception that one cell included a 5 mil thick Pellon interseparator in place of the negative titanate-containing interseparator.

Each of the cells was cycled on a 100% depth of discharge level with a charging procedure consisting of overcharging the cells by 50% on each cycle. The data derived from such tests are shown in the Table.

TABLE

| Neg. Interseparator Type | Thick.(mils) | Cycles to 50% of Original Capacity | Cycles to Short |
|---|---|---|---|
| Titanate | 6.5 | 105 | 120 |
| " | 13 | 113 | 115 |
| " | 20 | 98 | 105 |
| Pellon | 5 | 20 | 25 |

As will be seen from the Table, the presence of a titanate-containing negative interseparator provides a substantial advantage over cells which do not contain such an interseparator. It will also be noted from the Table that thickness of the titanate interseparator appears to have little effect on the working lift of a cell.

I claim:

1. In a rechargeable alkaline electrochemical cell comprising a positive electrode, a negative electrode, a main separator disposed between said positive and negative electrodes, and an alkaline electrolyte in contact with said electrodes and said main separator, the improvement which comprises:
   a negative interseparator disposed in said electrolyte between said main separator and said negative electrode and comprising
      a. an inorganic fibrous titanate material, and
      b. an inorganic fibrous matrix-forming material having a length and flexibility sufficient to form a matrix for said titanate material,
   said titanate material being present in an amount between about 50% and about 95% by weight of the weight of said (a) and (b), and said matrix-forming material being present in an amount sufficient to make up 100% by weight of said (a) and (b).

2. The improvement of claim 1 which further includes:
   c. a thickening agent which is relatively inert to the alkaline media in said electrochemical cells, said thickening agent being capable of increasing, and being present in amount sufficient to increase, the viscosity of a slurry of said (a) and (b) from which said negative interseparator may be formed,
   said titanate material being present in an amount between about 50% and about 95% by weight of the weight of said (a), (b) and (c), and said thickening agent and said matrix-forming material being present in a combined amount to make up 100% by weight of the weight of said (a), (b) and (c).

3. The improvement of claim 2 wherein said matrix-forming material and said thickening agent are present in amounts between about 4.5% and about 45% by weight and about 0.5% and about 5% by weight, respectively, of the weight of said (a), (b) and (c).

4. The improvement of claim 2 wherein said thickening agent is carboxymethyl cellulose, hydroxyethyl cellulose, ethyl cellulose, or methyl cellulose.

5. The improvement of claim 1 wherein said titanate material is potassium titanate, sodium titanate, magnesium titanate, calcium titanate, cerium titanate, barium titanate, magnesium-calcium titanate, or mixtures thereof.

6. The improvement of claim 1 wherein said matrix-forming material is chrysotile asbestos, zirconia fibers, alumino-silicate fibers or alumina fibers.

7. The improvement of claim 1 wherein a portion of said matrix-forming material is of colloidal size, the remainder of said matrix-forming material being present in amount sufficient to form a matrix for said titanate material.

8. The improvement of claim 1 wherein said titanate material is present in an amount between about 75% and about 92% by weight of the weight of said (a) and (b).

9. The improvement of claim 2 wherein said (a), (b) and (c) are present in amounts between about 75% and about 92%, between about 8% and about 25%, and between about 0.5% and about 2.5% by weight of the weight of said (a), (b) and (c), respectively.

10. The improvement of claim 1 wherein the length of said matrix-forming material is between about 200 and about 500 microns.

11. A composite structure for use as a negative interseparator in a rechargeable alkaline electrochemical cell, comprising:
   a. an inorganic titanate material, and
   b. an inorganic fibrous matrix-forming material having a length and flexibility sufficient to form a matrix for said titanate material,
   said titanate material being present in an amount between about 50% and about 95% by weight of the weight of said (a) and (b), and said matrix-forming material being present in an amount sufficient to make up 100% by weight of said (a) and (b).

12. The composite structure of claim 11 which further includes:
   c. a thickening agent which is relatively inert to alkaline media in rechargeable alkaline electrochemical cells, said thickening agent being capable of increasing, and being present in amount sufficient to increase, the viscosity of a slurry of said (a) and (b) from which said composite structure may be formed, said titanate material being present in an amount between about 50% and about 95% by weight of the weight of said (a), (b) and (c), and said thickening agent and said matrix-forming material being present in a combined amount to make up 100% by weight of the weight of said (a), (b) and (c).

13. The composite structure of claim 12 wherein said matrix-forming material and said thickening agent are present in amounts between about 4.5% and about 45% by weight and about 0.5% and about 5% by weight, respectively, of the weight of said (a), (b) and (c).

14. The composite structure of claim 12 wherein said thickening agent is carboxymethyl cellulose, hydroxyethyl cellulose, ethyl cellulose, or methyl cellulose.

15. The composite structure of claim 11 wherein said titanate material is potassium titanate, sodium titanate, magnesium titanate, calcium titanate, cerium titanate, barium titanate, magnesium-calcium titanate, or mixtures thereof.

16. The composite structure of claim 11 wherein said matrix-forming material is chrysotile asbestos, zirconia fibers, alumino-silicate fibers or alumina fibers.

17. The composite structure of claim 11 wherein a portion of said matrix-forming material is of colloidal size to serve as a thickening agent when forming said structure from a fluid medium, to remainder of said matrix-forming material being present in amount sufficient to form a matrix for said titanate material.

* * * * *